United States Patent [19]

Lo

[11] Patent Number: 5,636,474
[45] Date of Patent: Jun. 10, 1997

[54] HYDROPONIC MEANS FOR CULTURING EDIBLE SPROUTS

[75] Inventor: Kung-Shen Lo, Taipei Hsien, Taiwan

[73] Assignee: Li-Tai Peng, Taiwan

[21] Appl. No.: 645,558

[22] Filed: May 13, 1996

[51] Int. Cl.$^6$ ............................................ A01G 31/00
[52] U.S. Cl. ................................................ 47/61; 47/14
[58] Field of Search ............................. 47/61, 61 SG, 47/14

[56] References Cited

U.S. PATENT DOCUMENTS

| 4,180,941 | 1/1980 | Korematsu | 47/61 |
| 4,487,164 | 12/1984 | Yanagisawa | 47/61 SG |

FOREIGN PATENT DOCUMENTS

| 680970 | 12/1992 | Switzerland | 47/61 SG |
| 2164535 | 3/1986 | United Kingdom | 47/61 SG |

*Primary Examiner*—Terry Lee Melius
*Assistant Examiner*—Joanne C. Downs

*Attorney, Agent, or Firm*—Beveridge, DeGrandi, Weilacher & Young, L.L.P.

[57] ABSTRACT

Disclosed is a hydroponic apparatus for culturing edible sprouts mainly including a top cover, a growth lattice, a shoot lattice, a movable flat cutting means, a first net fixing lattice, a movable net, a second net fixing lattice, and a bottom tray for collecting water, each sequentially superposed on one another from top to bottom. When the sprout crop has grown sufficiently, the top cover is placed onto the growth lattice, and the flat cutting means is first inserted into the hydroponic means between the shoot lattice and the first net fixing lattice to cut off the root portions of the sprouts. Then, the movable net, the first and second net fixing lattices, and the bottom tray with the cut root portions are removed and the rest of the culturing is turned upside down. The flat cutting means is then inserted into the slits formed on the top cover to cut off the top portions of the sprouts. The remaining middle portion of the sprouts can be then washed clean and be packed for use later. A timer can be connected to the hydroponic means for automatically supplying water to multiple units of the hydroponic means superposed on one another in an outer container.

4 Claims, 4 Drawing Sheets

5,636,474

HYDROPONIC MEANS FOR CULTURING EDIBLE SPROUTS

BACKGROUND OF THE INVENTION

1. Field of the Invention

The present invention relates to a hydroponic means for culturing edible sprouts which facilitates removal of top and root portions of the sprouts in a quick and convenient manner by controlling the bedding of seeds and the growth direction of the sprouts. In addition, multiple units of such means can be superposed on one another and equipped with a timer to automatically supply or spray water, so that the sprouts can be mass-produced in limited space. Labor, time and the cost of separately cutting off the sprout tops and roots can be largely reduced.

2. Description of the Prior Art

Presently, there are two ways to culture edible sprouts. The first one is the traditional way in which no pesticide is added and the sprouts so cultured are thinner and yellowish with a longer root portion. The sprouts do not look good in their appearance but may be stored in low temperature for 7 to 10 days. In the other way, growth hormone, chemical fertilizer are added to the water in which the sprouts are cultured, so that the sprouts so cultured have higher water content to increase the weight at selling, the sprouts look thicker, white in color, with shorter root portions, and may be sold at higher price. However, sprouts so cultured may be stored in low temperature for only one day, or they shall change color and lose their good taste. Moreover, the addition of a chemical substance might have an adverse influence on the human body.

Both of the above two ways are used to mass-produce edible sprouts. However, it is desirable to remove the numerous root portions and top portions of the sprouts so that the sprouts are more delicious. It is time and labor consuming and inevitably increases the cost of sprouts if these root and top portions are individually removed by hands.

It is therefore desirable to develop a means and method to mass-produce edible and delicious sprouts without adding chemical substances while the root and the top portion of the sprouts can be removed in an efficient and economic manner.

SUMMARY OF THE INVENTION

A primary object of the invention is to provide a hydroponic means for culturing edible sprouts with which the sprouts grow in a substantially fixed direction and the root and the top portions of the sprouts can be conveniently removed.

Another object of the present invention is to provide a hydroponic means for culturing edible sprouts to which a timer can be connected to enable an automatic water supply to spray over the growing sprouts.

A further object of the present invention is to provide a hydroponic means for culturing edible sprouts in which multiple latticed members are superposed on one another to enable mass-production of sprouts within a limited space.

The hydroponic means for culturing edible sprouts according to the present invention includes multiple superposed lattices and a seed bedding net, a flat cutting means, a top cover, and a bottom tray. Holes formed on the lattices may be of any shape, such as round, square, or polygonal holes. When the sprouts have grown sufficiently, the flat cutting means can be first inserted into the hydroponic means between two lower lattices to cut off the root portions of the shouts, allowing the cut roots to fall down into the bottom tray. Then, remove the bottom tray with root portions from the hydroponic means and turn the means upside down, and insert the flat cutting means into splits formed on the top cover to cut off the top portions of the sprouts. By this way, the root and the top portions of the sprouts can be quickly separated from the middle portion of the sprouts and be removed away. The middle portion of the sprouts can be then washed clean with ozonic solution and be packed for use later.

BRIEF DESCRIPTION OF THE DRAWINGS

The structure and functions of the present invention can be best understood through the following detailed description of the preferred embodiment and the accompanying drawings, wherein.

DETAILED DESCRIPTION OF THE PREFERRED EMBODIMENTS

Figure 1:
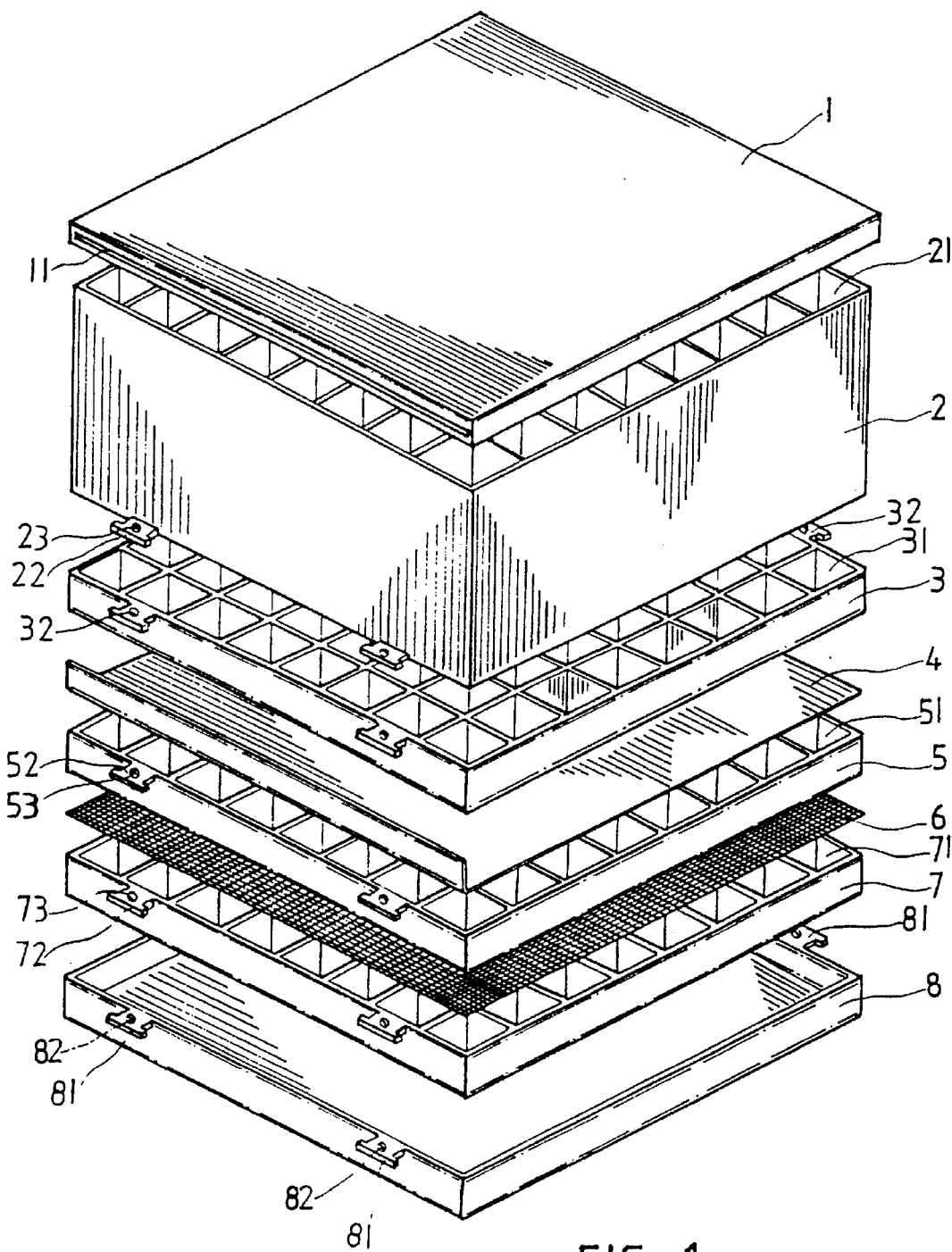
FIG. 1 is an exploded perspective of the present invention.
Figure 2:
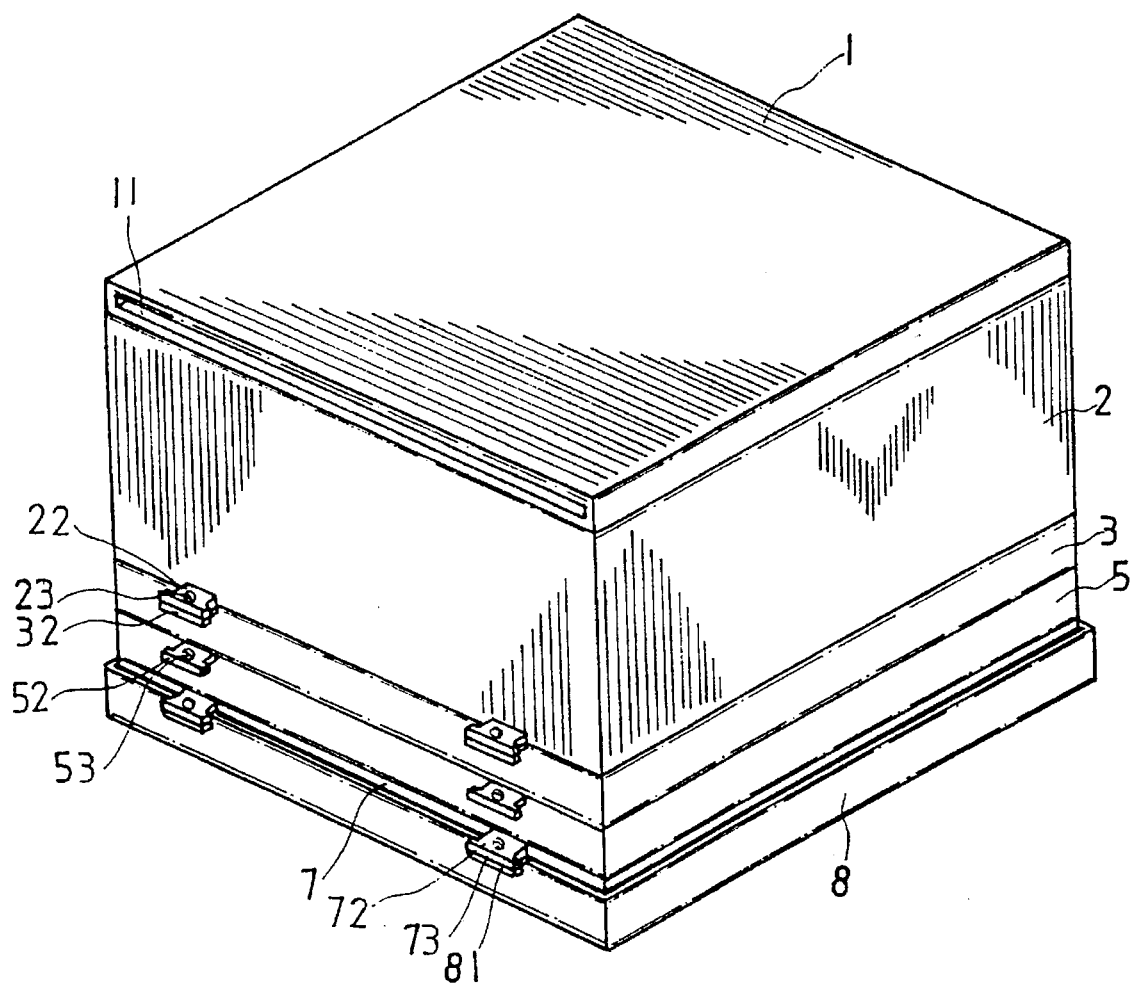
FIG. 2 is an assembled perspective of the present invention.
Figure 4:
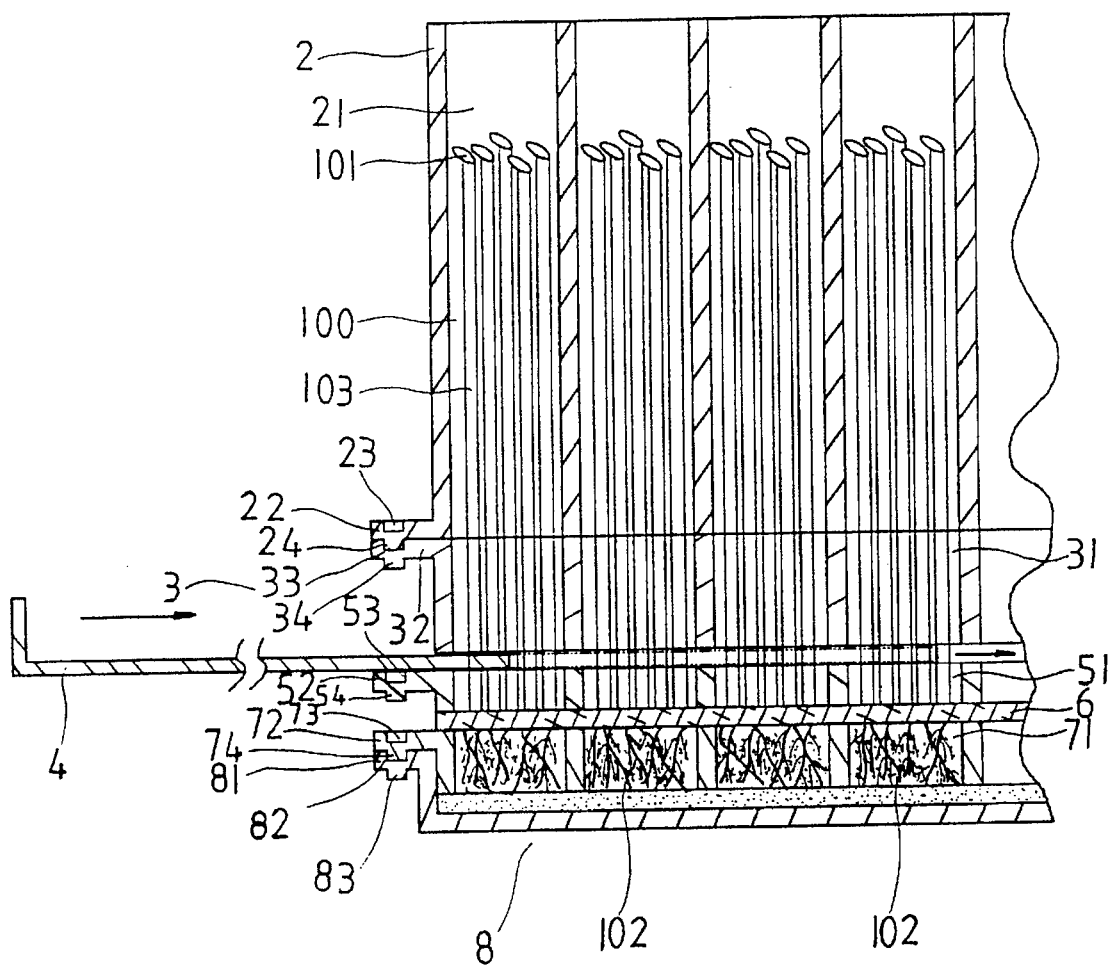
FIG. 4 is a fragmentary sectional view showing the manner in which the flat cutting means of the present invention is inserted into the hydroponic means to cut off the root portions of the sprouts.

Please refer to FIGS. 1, 2 and 4, the present invention relates to a hydroponic means for culturing edible sprouts and each unit mainly includes a top cover 1, a growth lattice 2, a shoot lattice 3, a movable flat cutting means 4, a first net fixing lattice 5, a movable net 6, a second net fixing lattice 7, and a bottom tray 8 for collecting water, sequentially superposed on one another from top to bottom.

The top cover 1 is placed onto the growth lattice 2 when the edible sprouts 100 cultured by means of the present invention are to be collected. Slits 11 are symmetrically formed on two opposite side walls of the top cover 1 for the flat cutting means 4 to insert into.

The growth lattice 2 is located below the top cover 1 for supporting the sprouts 100 so that they may keep growing upward in the lattice 2 in a generally fixed direction. Checked through holes 21 are formed in an area defined by the growth lattice 2 for the sprouts 100 to pass through. Two substantially T-shaped fastening means 22 each having a locating hole 23 formed on a top surface thereof are provided to two opposite sides of the lattice 2 adjacent to a lower edge thereof, and a locating pin 24 downward projects from an underside of each of the fastening means 22.

The shoot lattice 3 is located below the growth lattice 2 and also defines a plurality of checked through holes 31 for supporting the newly put out sprouts 100 so that they may grow in a generally fixed direction. Two substantially T-shaped fastening means 32 each having a locating hole 33 formed on a top surface thereof are provided on two opposite sides of the lattice 3 adjacent to an upper edge thereof, and a pin 34 downward projects from an underside of each of the fastening means 32. The locating hole 33 each has a configuration corresponding to that of the locating pin 24 so that the shoot lattice 3 may be connected to the growth lattice 2 by engagment of the locating holes 33 with the locating pins 24.

The flat cutting means 4 is designed to cut off a top portion 101 and a root portion 102 of the grown sprouts 100, so that an edible and delicious middle portion 103 of the sprouts 100 can be separated from the top and the root portions 101, 102. The flat cutting means 4 has a handling end for convenient holding when it is in use.

The first net fixing lattice 5 is located below the shoot lattice 3 and defines a plurality of checked through holes 51 also for supporting the newly put out sprouts 100 so that they may grow in a generally fixed direction. Two substantially T-shaped fastening means 52 each having a locating hole 53 formed on a top surface thereof are provided to two opposite sides of the lattice 5 adjacent to an upper edge thereof, and a locating pin 54 downward projects from an underside of each of the fastening means 52.

The movable net 6 is located below the first net fixing lattice 5 and has tiny meshes formed thereon. Seeds or soaked beans are spread over the movable net 6 for them to bed thereon. The root portions 102 of the sprouts 100 are firmly fixed to the net 6 when the seeds or soaked beans begin to sprout. The movable net 6 is easy to replace and clean.

The second net fixing lattice 7 is located below the movable net 6 for the fine roots 102 of the sprouts 100 to orderly extend downward through checked through holes 71 of the lattice 7. Two substantially T-shaped fastening means 72 each having a locating hole 73 formed on a top surface thereof are provided on two opposite sides of the lattice adjacent to an upper edge thereof, and a locating pin 74 downward projects from an underside of each of the fastening means 72. The locating hole 73 each has a configuration corresponding to that of the locating pin 54 so that the second net fixing lattice 7 may be connected to the first net fixing lattice 5 by engagment of the locating holes 73 with the locating pins 54.

The bottom tray 8 is located below the second net fixing lattice 7 and receives the same therein. Water is contained in the bottom tray 8 and supplied to the roots 102 of the sprouts 100. Two substantially T-shaped fastening means 81 each having a locating hole 82 formed on a top surface thereof are provided to two opposite sides of the bottom tray 8 adjacent to an upper edge thereof, and a locating pin 83 downward projects from an underside of each of the fastening means 81.

To use the present invention, first position the movable net 6 between the first and the second net fixing lattices 5, 7, then evenly spread a properly predetermined quantity of seeds or soaked beans from the top of the first net fixing lattice 5, so that the seeds or soaked beans freely but evenly fall onto the movable net 6. Thereafter, sequentially superpose the growth lattice 2, the shoot lattice 3, the lattices 5 and 7 and the sandwiched net 6, and the bottom tray 8 from top to bottom, and firmly lock the adjacent lattices 2 and 3, and the lattice 7 and the bottom tray 8 together by engaging the locating pin of an upper layer with the locating hole of a lower layer to complete the assembly of one unit of the hydroponic means of the present invention, as shown in FIG. 2.

Figure 3:
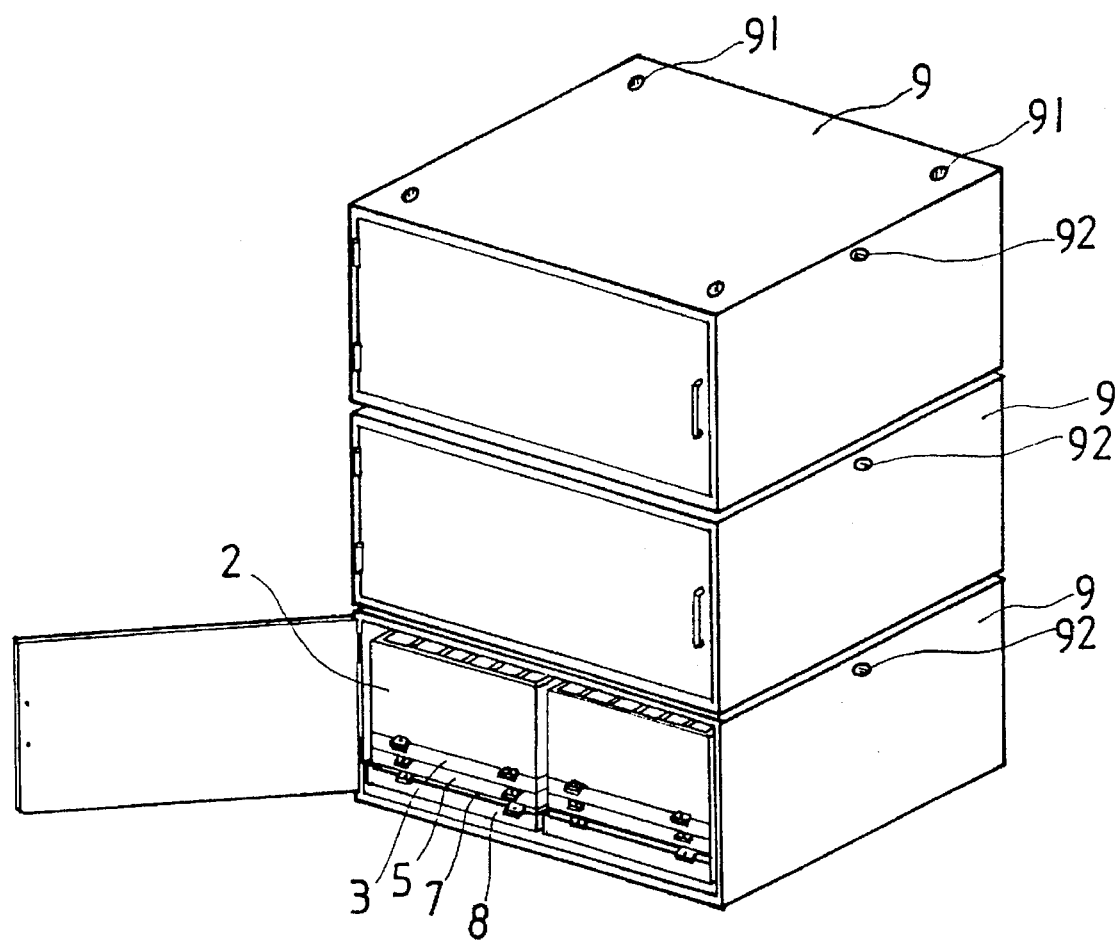
FIG. 3 illustrates the manner in which multiple units of the hydroponic means according to the present invention are disposed inside some superposed culture containers.

Please refer to FIG. 3, multiple units of the hydroponic means of the present invention can be superposed on one another and/or be disposed in a container 9 with door. To allow multiple containers 9 to superpose on one another to occupy the smallest room possible, a groove 91 is provided on an upper surface of each container 9 around a peripery thereof to fixedly receive another container 9 thereto. At least a hose connector 92 is provided to one or two side walls of the container 9 (other than the wall with the door) so that the assembled units of the hydroponic means can be positioned inside the container 9 with the door closed and water can be introduced into or drained from the container 9 under an automatic control. By this way, the edible sprouts 100 can be cultured under controlled water supply, temperature, and humidity.

Please now refer to FIG. 4. When the sprouts 100 reach the time of crop, open the container 9 and remove the units of the hydroponic means from the container 9. Place the top cover 1 onto the growth lattice 2. Insert the flat cutting means 4 into the hydroponic means between the superposed but not locked shoot lattice 3 and the first net fixing lattice 5 by slightly lifting the lattice 3. At this point, the root portions 102 of the sprouts 100 are cut off and separate from the middle edible portion 103 of the sprouts 100. Then, remove the first and the second net fixing lattices 5, 7 and the net 6 having fine roots 102 remaining therebetween, as well as the bottom tray 8. Then, turn the rest portion of the means upside down, including the flat cutting means 4, the still connected growth lattice 2 and the shoot lattice 3, and the top cover 1, so that the sprouts 100 without roots 102 in the growth lattice 2 all turned upside down with their top portions 101 pointing downward and becoming flush with the top cover 1. At this point, move the flat cutting means 4 and insert it into the slits 11 formed on two opposite walls of the top cover 1, cutting off the top portions 101 of the sprouts 100. The remained middle portions 103 of the sprouts 100 can be then conveniently washed clean and packed. By this way, the labour and time required to remove the roots and heads of the sprouts 100 and to clean the middle portions can be largely reduced.

With the above arrangements of the hydroponic means of the present invention, we not only can culture edible sprouts in a mass-production manner, but also can have the sprouts to grow in a generally fixed direction so that the roots and/or tops of the grown sprouts can be conveniently cut off. In addition, a timer can be attached to the hydroponic means so that water supplied to the growing sprouts can be automatically controlled. All of these advantages permit the edible sprouts to be cultured with much lower cost while the sprouts so cultured taste more delicious.

What is claimed is:

1. A hydroponic apparatus for culturing sprouts, comprising:

a top cover, a growth lattice, a shoot lattice, a flat cutting means, a first net fixing lattice, a net, a second net fixing lattice, and a bottom tray for collecting water;

said top cover having two opposite side walls each having a slit defined therein for receiving said flat cutting means;

said growth lattice being located below said top cover and having a plurality of through holes defined therein for supporting said sprouts, said growth lattice being provided on each of two opposite sides with at least one fastening means;

said shoot lattice being located below said growth lattice and having a plurality of through holes defined therein for supporting said sprouts, said shoot lattice being provided on each of two opposite sides with at least one fastening means;

said first net fixing lattice being located below said shoot lattice and having a plurality of through holes defined therein for supporting said sprouts, said first net fixing lattice being provided on each of two opposite sides with at least one fastening means;

said net being located below said first net fixing lattice and having tiny meshes defined therein for seeds or soaked beans of said sprouts to be spread and bed thereon so that roots of said sprouts attach to said net;

said second net fixing lattice being located below said net and having a plurality of through holes defined therein for said roots of said sprouts to extend downward therethrough, said second net fixing lattice being provided on each of two opposite sides with at least one fastening means;

said bottom tray being located below said second net fixing lattice and receiving said second net fixing lattice therein, said bottom tray being provided on each of two opposite sides with at least one fastening means; and said flat cutting means having an edge for cutting off top portions and said roots of said sprouts so that a middle portion of said sprouts are separated from said top portions and said roots, said flat cutting means having a handling end for holding when in use;

wherein, when said sprouts reach a desired length, said flat cutting means is inserted between said shoot lattice and said first net fixing lattice to cut off said roots, and into said slits of said top cover to cut off said top portions of said sprouts.

2. A hydroponic apparatus for culturing sprouts as defined in claim 1, wherein said fastening means of said growth lattice, said shoot lattice, said first and said second net fixing lattices, and said bottom tray are substantially T-shaped.

3. A hydroponic apparatus for culturing sprouts as defined in claim 1, wherein said fastening means of said growth lattice, said shoot lattice, said first and said second net fixing lattices, and said bottom tray have a locating hole defined on a top surface and a locating pin projecting downward from an underside of said fastening means.

4. A hydroponic apparatus for culturing sprouts as defined in claim 1, further comprising a container for housing at least two of said hydroponic apparatuses for culturing sprouts, said container being provided on one side wall with a door, on at least one side wall other than said side wall with said door with at least one hose connector for supplying water to said hydroponic apparatuses, and on a top surface, proximal to a periphery thereof, with at least one groove to permit another said container to be placed thereon.

* * * * *